(12) United States Patent
Maripudi et al.

(10) Patent No.: US 7,407,185 B2
(45) Date of Patent: Aug. 5, 2008

(54) PASSENGER AIRBAG WITH A DIFFUSER

(75) Inventors: Vivekananda S. Maripudi, Rochester Hills, MI (US); Tom Lipscomb, Macomb Township, MI (US)

(73) Assignee: TK Holdings Inc., Auburn Hills, MI (US)

( * ) Notice: Subject to any disclaimer, the term of this patent is extended or adjusted under 35 U.S.C. 154(b) by 364 days.

(21) Appl. No.: 11/071,576

(22) Filed: Mar. 4, 2005

(65) Prior Publication Data
US 2006/0197327 A1 Sep. 7, 2006

(51) Int. Cl.
*B60R 21/16* (2006.01)

(52) U.S. Cl. ................. 280/743.1; 280/743.2

(58) Field of Classification Search ............. 280/743.1, 280/730.1, 740
See application file for complete search history.

(56) References Cited
U.S. PATENT DOCUMENTS

| | | | |
|---|---|---|---|
| 5,494,314 A | 2/1996 | Kriska et al. | |
| 5,951,038 A * | 9/1999 | Taguchi et al. | 280/729 |
| 6,089,599 A | 7/2000 | Schimmoller et al. | |
| 6,345,841 B2 | 2/2002 | Igawa et al. | |
| 6,827,368 B2 * | 12/2004 | Jang et al. | 280/729 |
| 2001/0000015 A1 | 3/2001 | Igawa et al. | |
| 2002/0027350 A1 | 3/2002 | Pinsenschaum et al. | |
| 2003/0047926 A1 | 3/2003 | Varcus et al. | |
| 2003/0173762 A1 * | 9/2003 | Kamagari et al. | 280/743.1 |
| 2004/0104561 A1 | 6/2004 | Maertens | |
| 2004/0169360 A1 * | 9/2004 | Chavez | 280/743.12 |

* cited by examiner

*Primary Examiner*—Faye M. Fleming
(74) *Attorney, Agent, or Firm*—Foley & Lardner LLP

(57) ABSTRACT

A three-panel, passenger-side airbag includes main, right, and left panels, and a diffuser provided adjacent a rear side of the main panel. The main panel includes a front impact said and a rear inflation side. The front impact side is formed of upper and lower portions. When the airbag is inflated, the upper portion is configured to be directed toward the upper torso of a passenger and the lower portion in configured to be directed toward the passenger's lower torso, groin, and legs. The diffuser is configured to direct inflation gas toward the lower portion so that the lower portion inflates faster than the upper portion.

19 Claims, 4 Drawing Sheets

PASSENGER AIRBAG WITH A DIFFUSER

BACKGROUND

The present invention relates a passenger airbag, which is filled with gas during an emergency situation such as, for example, a frontal or side impact. Conventionally, during such emergency situations, passenger-side airbags, which generally deploy from an automotive dashboard, are constructed to inflate uniformly, i.e., all portions of the airbag are simultaneously inflated.

Uniform airbag inflation can, however, be problematic for both large occupants who are sitting out-of-position and for small occupants who tend to be positioned close to the dashboard. For example, if these occupants are wearing seatbelts, the uniform inflation of the airbag will first cause the airbag to impact the occupant's upper torso and then subsequently impact the occupant's lower torso, groin, and upper legs. As a result of the initial impact solely being directed to the occupant's upper torso, the whole of the occupant is not uniformly decelerated, which may contribute to neck injury.

What is needed, therefore, is a passenger airbag that, when inflated, will substantially simultaneously impact the occupant's upper and lower torso, thereby reducing the likelihood of neck injury.

SUMMARY OF THE INVENTION

According to an embodiment of the invention a passenger-side airbag is provided. This airbag includes, among other possible things: (a) a front impact side; (b) a rear inflation side; and (c) a diffuser provided adjacent the rear side. The front impact side has an upper portion and a lower portion. When the airbag is inflated, the upper portion is configured to be directed toward the upper torso of a passenger and the lower portion in configured to be directed toward the passenger's lower torso, groin, and legs. The diffuser is configured to direct inflation gas toward the lower portion so that the lower portion inflates faster than the upper portion.

In a further embodiment of this airbag, the diffuser may be formed of a sheet, which is folded into an upper layer and a lower layer.

In another further embodiment of this airbag, the lower layer may be sewn into a lower side of the rear portion.

In another further embodiment of this airbag, the upper layer may expand upward and toward an upper side of the rear portion, when the airbag is inflated.

According to an embodiment of the present invention, the upward movement oft the upper layer may be limited by the dimensions of the diffuser and the perimeter sewing construction.

In another further embodiment of this airbag, the upward movement of the upper layer may be limited by a tether.

In another further embodiment of this airbag, the airbag may further include a heat shield overlaying the diffuser sheet.

In another further embodiment of this airbag, the diffuser may be formed of fabric. In another further embodiment of this airbag, the heat shield may be formed of fabric.

Another embodiment of the present invention address an airbag apparatus. The airbag apparatus includes, among other possible things: (a) a passenger-side airbag that includes, among other possible things: (i) a front impact side; (ii) a rear inflation side; and (i11) a diffuser provided adjacent the rear side; and (b) an inflator configured to inflate the airbag. The front impact side has an upper portion and a lower portion. When the airbag is inflated, the upper portion is configured to be directed toward the upper torso of a passenger and the lower portion in configured to be directed toward the passenger's lower torso, groin, and legs. The diffuser is configured to direct inflation gas toward the lower portion so that the lower portion inflates faster than the upper portion.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Embodiments of the present invention will be described below with reference to the drawings.

Figure 1:
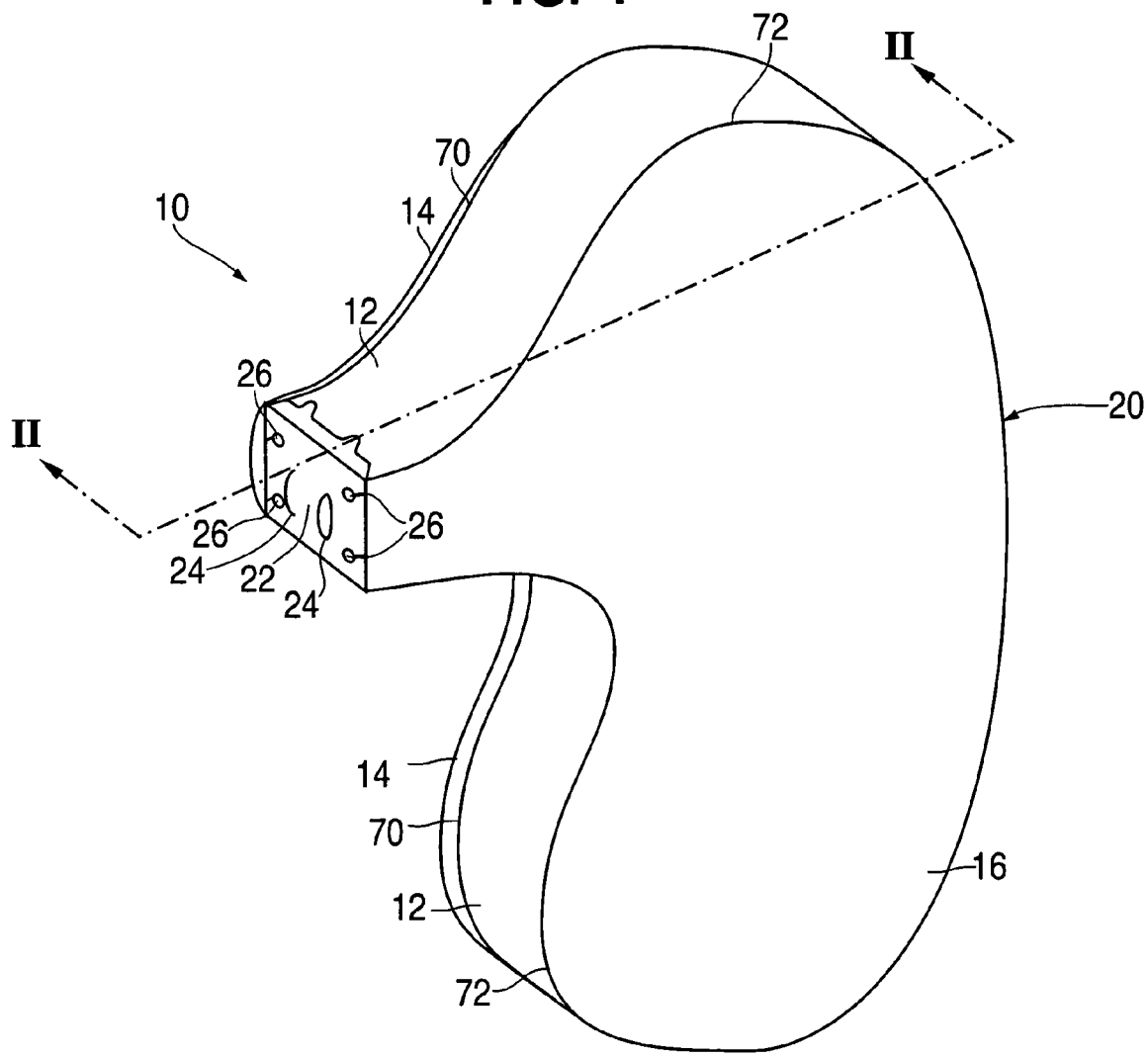
FIG. 1 is a perspective view of a kidney-shaped passenger-side airbag (in an inflated state) according to an embodiment of the present invention.

FIG. 1 is a perspective view of a kidney-shaped passenger-side airbag (in an inflated state) 10 according to an embodiment of the present invention. The airbag 10 is formed of three panels. Specifically, the airbag is formed of a main panel 12, a right side (when viewing the airbag from a seated position) panel 14, and a left side panel 16. Each of the side panels 14, 16 is generally planar (when the airbag 10 is not inflated) and has a kidney-like shape. In contrast, the main panel 12 wraps around the airbag 10. As a result, the entirety of the right edge of the main panel 12 is connected along a seam 70 (e.g., by stitching, sewing, or other suitable means) to the right panel 14 and the entirety of the left edge of the main panel 12 is connected along a seam 72 (e.g., by stitching, sewing, or other suitable means) to the left panel 16.

The main panel 12 has both a front impact side 20 and a rear inflation side 22. After wrapping around the airbag 10, the ends 92, 93 of the main panel 12 are joined at the rear inflation side, as later described in detail. In addition, the rear inflation side 22 has slits 24, which are sized to receive an inflator 40, and may also include holes 26, which are sized to receive bolts (or other suitable fasteners) that are configured to secure the airbag 10 to the body of an automobile (or other device).

Figure 2:
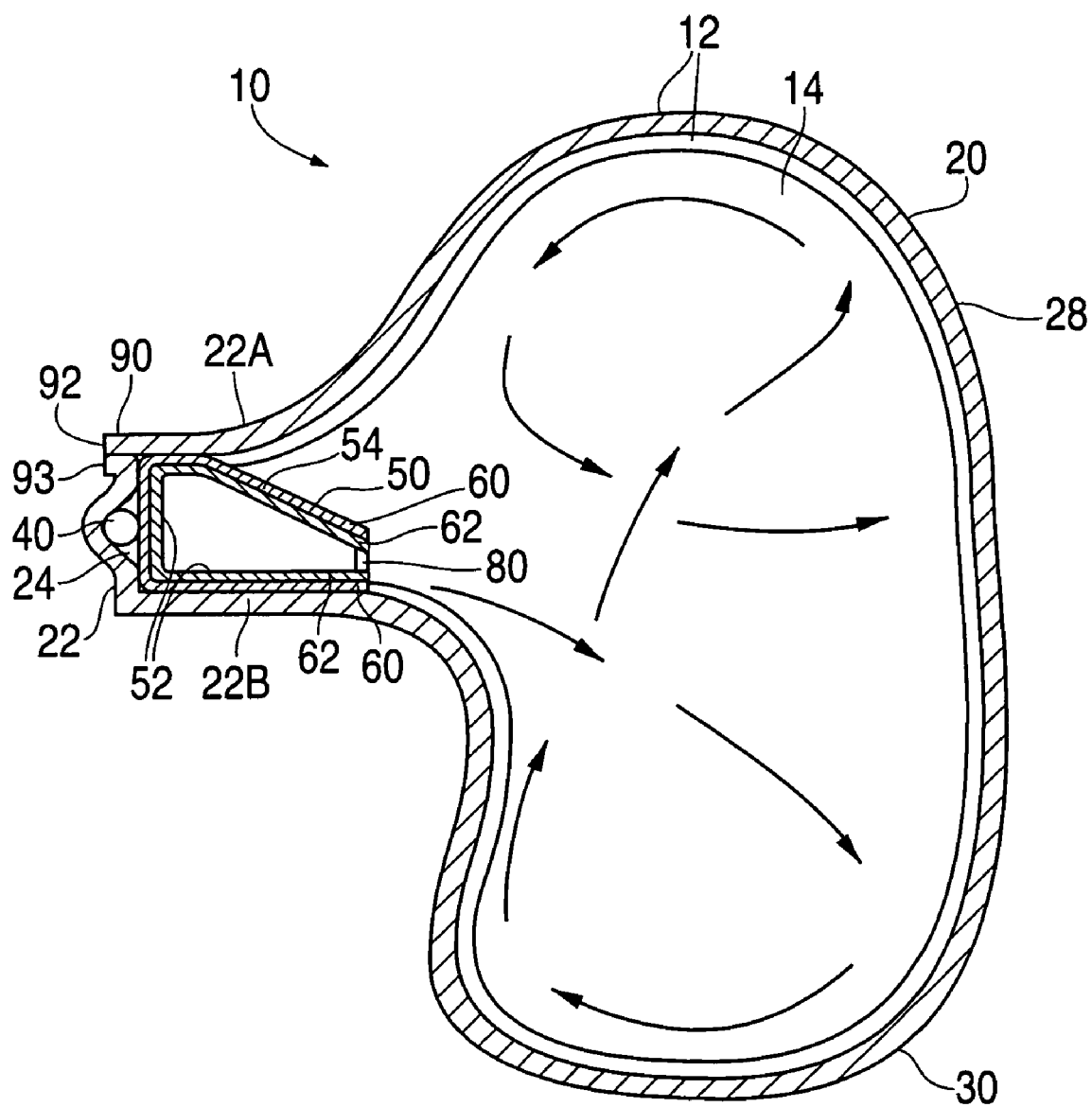
FIG. 2 is a cross-sectional view of the airbag of FIG. 1 taken along line II-II, the view showing an inflator being positioned in the airbag.

As shown in FIG. 2, the front impact side 20 of the main panel 12 includes both an upper portion 28 and a lower portion 30. When the airbag 10 is inflated, the upper portion 28 is configured to be directed toward the upper torso of a passenger and the lower portion 30 in configured to be directed toward the passenger's lower torso, groin, and legs. Moreover, as a result of a diffuser 50, which will later be discussed in detail with respect to FIGS. 3 and 4, gas emitted by an inflator 40 is first directed toward the lower portion 30 of the front impact side 20, as indicated by the arrows in FIG. 2. Accordingly, the lower portion 30 inflates faster than the upper portion 28.

As a result of the faster inflation of the lower portion 30, during an emergency situation, a passenger, who is wearing a seat belt, will be generally uniformly impacted by the impact side 20 of the main panel 12. In other words, the passenger's upper torso will be impacted by the upper portion 28 of the impact side 20 while the passenger's lower torso is simultaneously impacted by the lower portion 30 of the impact side 20. As a result, the passenger, including the center of gravity thereof, is uniformly decelerated. The generally uniform deceleration reduces the likelihood of neck injury to large occupants who are sitting out-of-position and for small occupants who tend to be positioned close to the dashboard.

Figure 3:
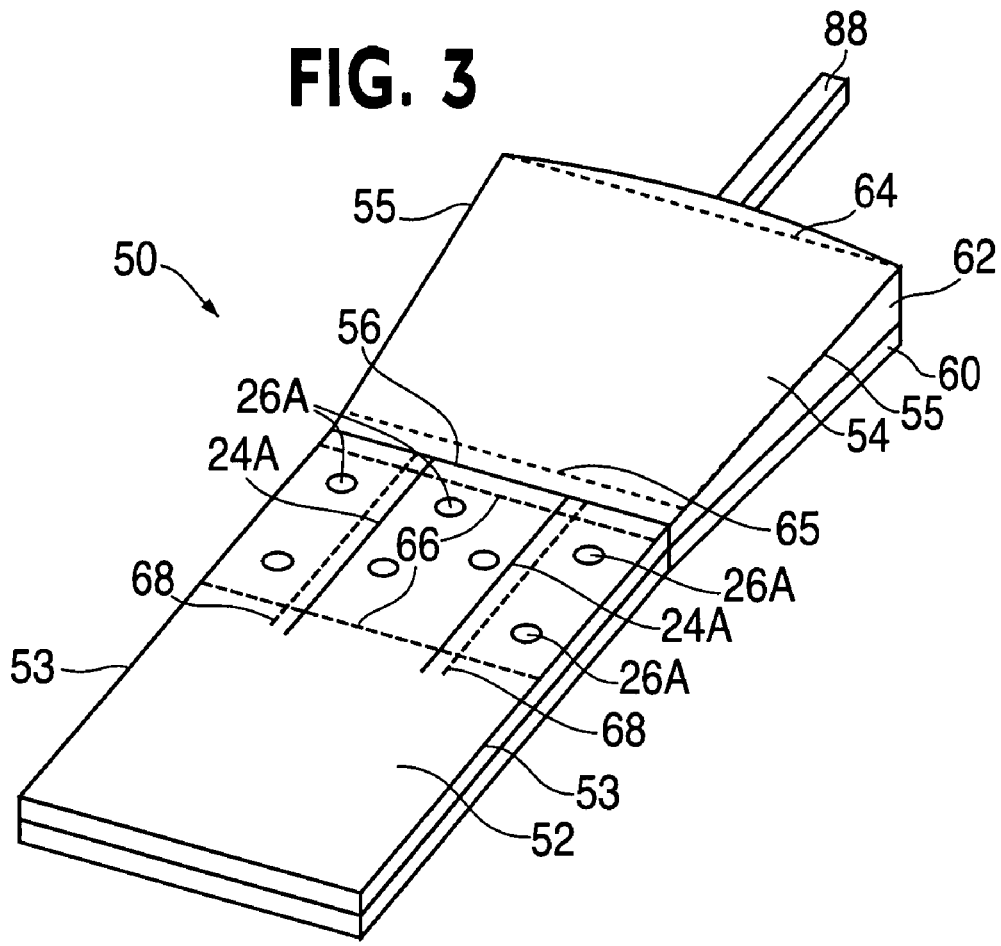
FIG. 3 is a perspective view of a non-assembled diffuser, which used in the airbag of FIG. 1.
Figure 4:
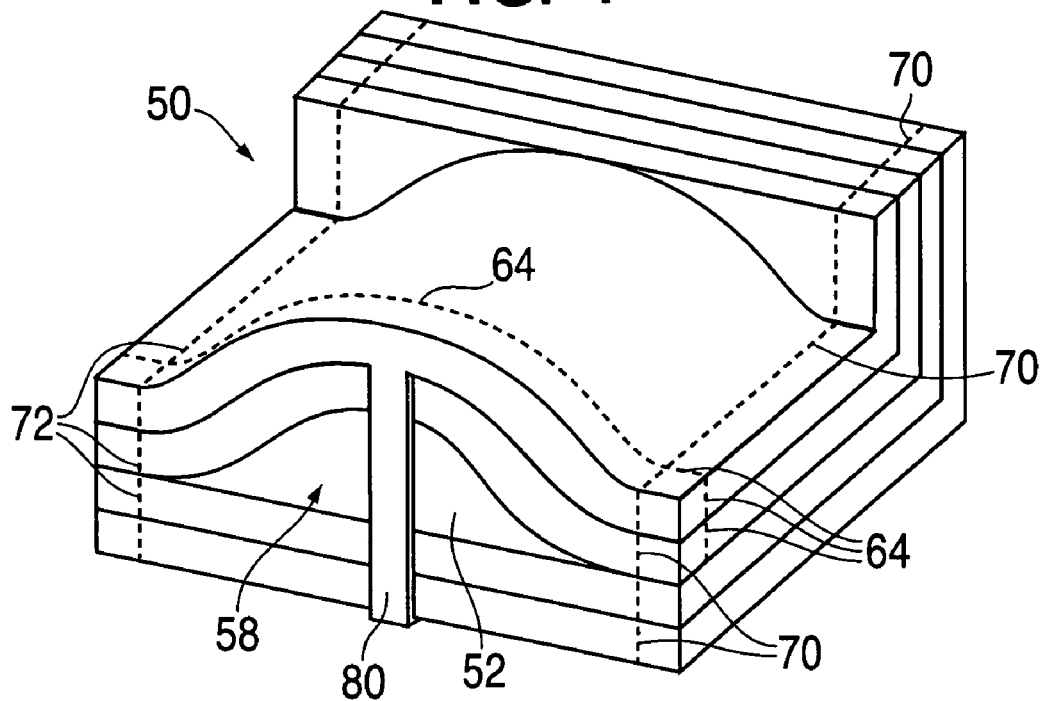
FIG. 4 is a perspective view of the diffuser of FIG. 3 in an assembled state.

As previously mentioned, the generally uniform deceleration of the passenger is generated by means of the diffuser 50, which will now be discussed with reference to FIGS. 3 and 4. As shown in FIG. 3, the diffuser is formed of planar sheet that has two ends/layers 52, 54 of slightly different shapes, the relevance of which will later be discussed in detail.

The ends/layers 52, 54 are integrally formed of a single base sheet. In addition, as the inflator 40 will emit hot, pressured gas into the airbag 10, a conventional heat shield 62 may overlay the sheet 60 and be affixed thereto in any conventional manner such as, for example, by seams 64, 65, adhesive, etc. Regardless of whether a heat shield 62 is provided, the first end/layer 52 is positioned on one of the ends 93 of the main panel 12 and is affixed thereto by means of seams 66, 68. Subsequently, slits 24, 24A and holes 26, 26A can be formed through the first end/layer 52 and the attached end of the main panel 12.

After attaching the first end/layer 52 to the main panel 12, the second end/layer 54 is folded toward the first end/layer 54. It is at this point that the differing shapes of the end/layers 52, 54 are relevant. Specifically, the first end/layer 52 is formed in a generally rectangular shape and the second end/layer 54 is generally trapezoidal in shape. The outer (i.e., the nonparallel) edges 55 of the second end/layer 54 have substantially the same length as the outer edges 53 of the first end/layer 52. As a result, when the second end/layer 54 is folded toward the first end/layer 52, along a folding line 56, the edges 55 of the second end/layer 54 can be forced of overlay the edges 53 of the first end/layer 52, thereby creating a pocket 58 having an opening 59 (shown in FIG. 4). Subsequently, the second end/layer 54 can be affixed to the first end/layer 52 by means of seams 70, 72. Moreover, in some embodiments, the seams 70, 72 can also join the main panel 12 to the side panels 14, 16 proximate the edges of the main panel.

After the second end/layer 54 is connected to the first end/layer 52, in some embodiments a reinforcing tether 80, which may project from either the first or second end/layer 52, 54 (for purposes of illustration only, the tether 80 is shown projecting from the second end/layer 54), may be wrapped across the opening 59 and sewn to an underside (or topside) of the first end/layer 52 (second end layer 54). The tether 80 may be used to maintain the shape of the pocket 58. In other words, when the pocket 58 is inflated, the second end/layer 54 will move upward and toward an upper side 22A (FIG. 2) of the rear inflation side 22 of the main panel 12. The upward movement of the second end/layer 54 will be restrained, however, by the tether 80, thereby ensuring that the pocket 58 retains its desired shape, i.e., so that the opening 59 of the pocket 58 directs the inflation gas toward the lower portion 30 of the impact side 30 of the main panel 12.

Figure 5:
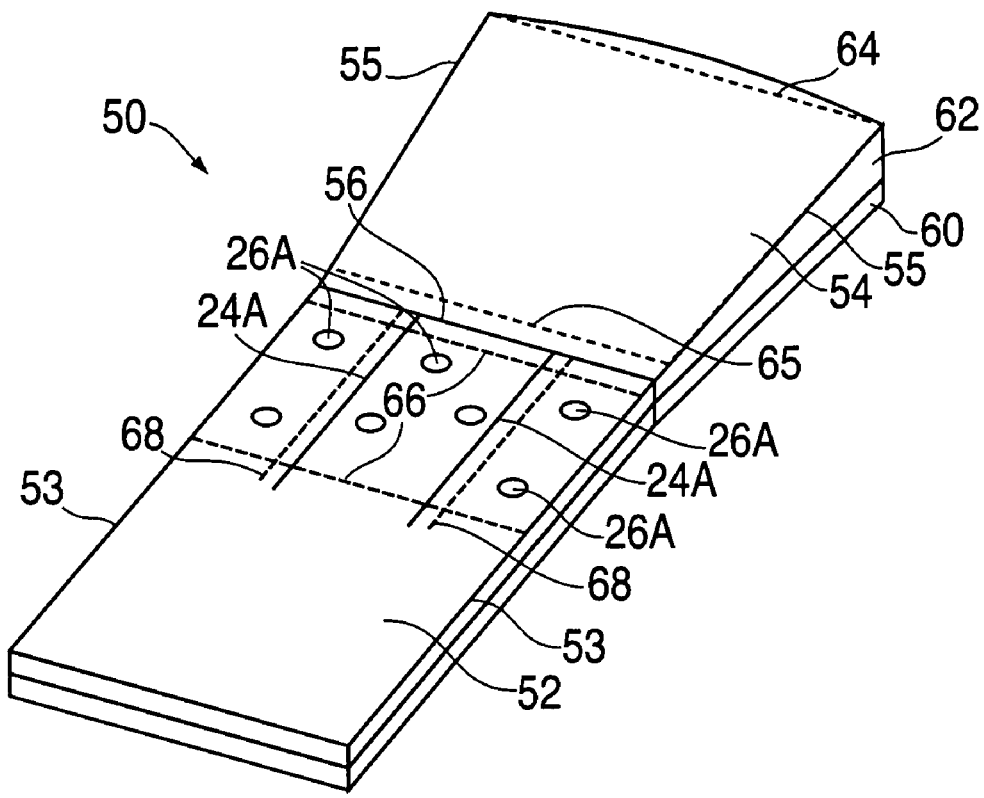
FIG. 5 is a perspective view of a non-assembled diffuser according to an embodiment of the present invention, which may be used in the airbag of FIG. 1.
Figure 6:
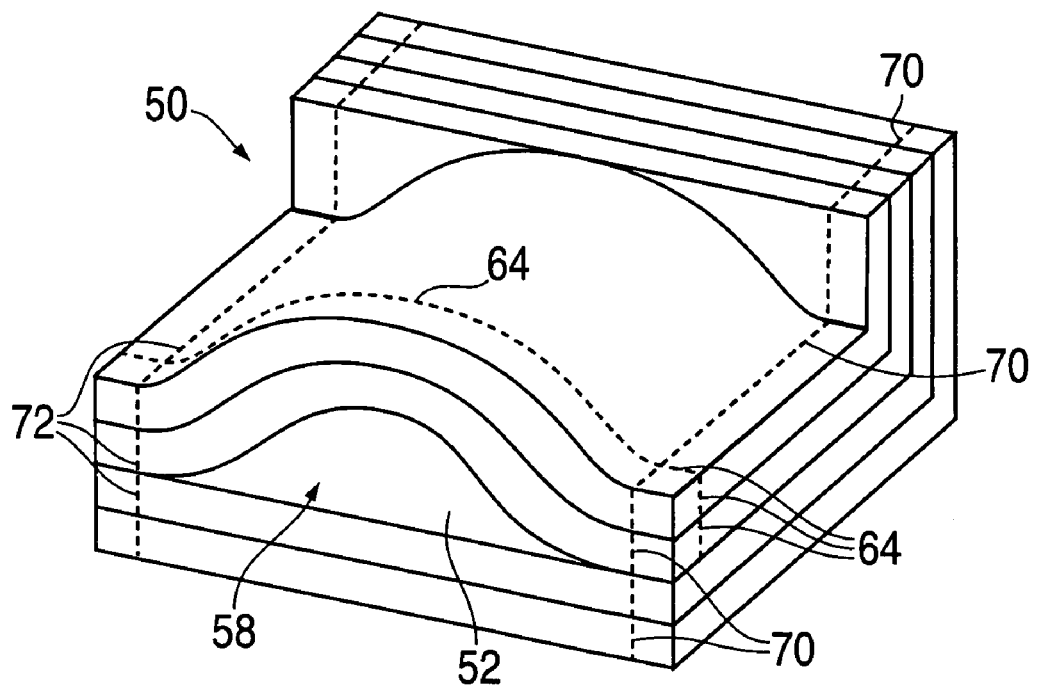
FIG. 6 is a perspective view of the diffuser of FIG. 5 in an assembled state.

As shown in FIGS. 5 and 6, the tether 80 may be omitted from the diffuser design. When a tether is not provided, the movement of the upper layer of the diffuser is limited by the perimeter sewing construction connecting the upper layer to the lower layer.

Regardless of whether a tether 80 is provided, after the diffuser 50 is completed, the ends 92, 93 of the main panel 12 can be joined by, for example, a seam 90 (FIG. 2), thereby enclosing the diffuser 50 in the airbag 10.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A passenger-side airbag comprising:
   a front impact side;
   a rear inflation side;
   a diffuser provided adjacent the rear side, wherein the diffuser is formed of a single sheet folded into an upper layer and a lower layer; and
   a heat shield positioned adjacent the upper layer of the diffuser,
   wherein the front impact side has an upper portion and a lower portion,
   wherein, when the airbag is inflated, the upper portion is configured to be directed toward the upper torso of a passenger and the lower portion in configured to be directed toward the passenger's lower torso, groin, and legs, and
   wherein the diffuser is configured to direct inflation gas toward the lower portion so that the lower portion inflates faster than the upper portion.

2. The passenger-side airbag according to claim 1, wherein the lower layer is sewn into a lower portion of the rear side of the airbag adjacent the inflator.

3. The passenger-side airbag according to claim 2, wherein the upper layer expands upward and toward an upper portion of the rear side, when the airbag is inflated.

4. The passenger-side airbag according to claim 3, wherein movement of the upper layer is limited by a tether.

5. The passenger-side airbag according to claim 1, wherein the diffuser is formed of fabric.

6. The passenger-side airbag according to claim 1, wherein the heat shield is formed of fabric.

7. The passenger-side airbag according to claim 1, wherein the airbag further comprises:
   a main panel comprising:
      the front impact side; and
      the rear inflation side;
   a right panel attached to one edge of the main panel;
   a left panel attached to a second edge of the main panel.

8. An airbag apparatus comprising:
   a passenger-side airbag comprising:
      a front impact side;
      a rear inflation side; and
      a diffuser provided adjacent the rear inflation side, the diffuser including a sheet with a first end portion and a second end portion, an edge of the first end portion is sewn to an edge of the second end portion creating a pocket between the first and second end portions; and an inflator configured to inflate the airbag, wherein the front impact side has an upper portion and a lower portion, wherein, when the airbag is inflated, the upper portion is configured to be directed toward the upper torso of a passenger and the lower portion in configured to be directed toward the passenger's lower torso, groin, and legs, and wherein the diffuser is configured to direct inflation gas toward the lower portion so that the lower portion inflates faster than the upper portion.

9. The airbag apparatus according to claim 8, wherein the first end portion is sewn into a lower portion of the rear side.

10. The airbag apparatus according to claim 9, wherein the second end portion expands upward and toward an upper portion of the rear side, when the airbag is inflated.

11. The airbag apparatus according to claim 10, wherein movement of the second end portion is limited by a tether.

12. The airbag apparatus according to claim 8, further comprising a heat shield overlaying the second end portion.

13. The airbag apparatus according to claim 8, wherein the diffuser is formed of fabric.

14. The airbag apparatus according to claim 12, wherein the heat shield is formed of fabric.

15. The airbag apparatus according to claim 8, wherein the airbag further comprises:
   a main panel comprising:
      the front impact side; and
      the rear inflation side;
   a right panel attached to one edge of the main panel;
   a left panel attached to a second edge of the main panel.

16. A three-panel, passenger-side airbag comprising:
   a main panel comprising:
      a front impact side; and
      a rear inflation side;
   a right panel attached to one edge of the main panel;
   a left panel attached to a second edge of the main panel;
   a diffuser provided adjacent the rear side,
   wherein the front impact side has an upper portion and a lower portion,
   wherein, when the airbag is inflated, the upper portion is configured to be directed toward the upper torso of a passenger and the lower portion in configured to be directed toward the passenger's lower torso, groin, and legs, and
   wherein the diffuser is configured to direct inflation gas toward the lower portion so that the lower portion inflates faster than the upper portion, and
   wherein the diffuser includes a tether.

17. An airbag apparatus comprising the three-panel, passenger-side airbag according to claim 16; and an inflator configured to inflate the airbag.

18. The airbag apparatus according to claim 8, wherein the first end portion is generally rectangular and the second end portion is generally trapezoidal.

19. The three-panel, passenger side airbag according to claim 16, wherein the diffuser includes a sheet with a first end portion and a second end portion, an edge of the first end portion is sewn to an edge of the second end portion creating a pocket between the first and second end portions.

* * * * *